(No Model.)
F. M. ASHTON.
PIPE TESTING GAGE.
No. 438,597. Patented Oct. 21, 1890.
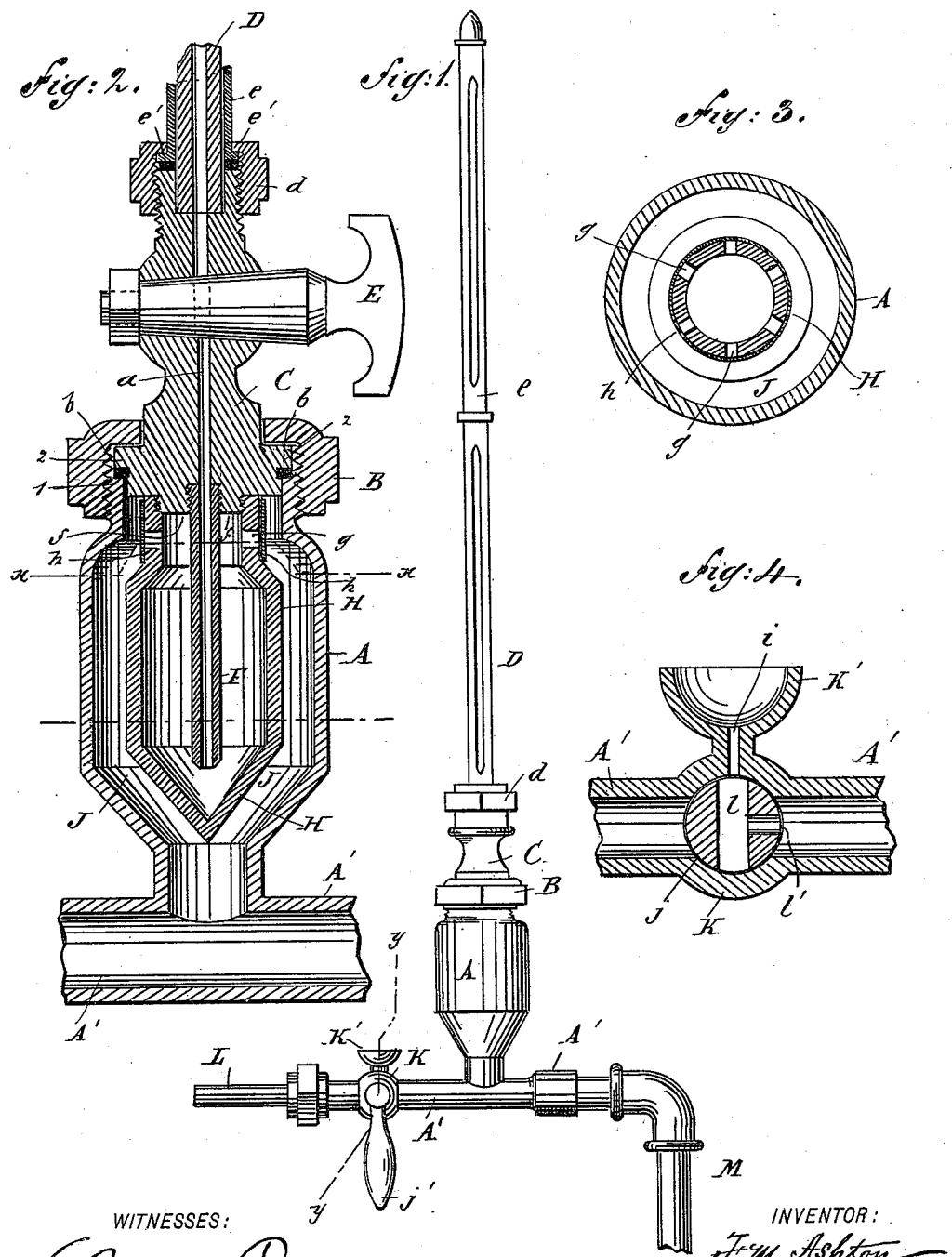
WITNESSES:
INVENTOR:
F. M. Ashton
BY Munn & Co.
ATTORNEYS

United States Patent Office.

FRANCIS M. ASHTON, OF LIMA, OHIO.

PIPE-TESTING GAGE.

SPECIFICATION forming part of Letters Patent No. 438,597, dated October 21, 1890.

Application filed January 15, 1890. Serial No. 337,001. (No model.)

To all whom it may concern:

Be it known that I, FRANCIS M. ASHTON, of Lima, in the county of Allen and State of Ohio, have invented a new and Improved Pipe-Testing Gage, of which the following is a full, clear, and exact description.

My invention relates to improvements in gages for testing gas and other pipes to ascertain whether or not they are tight.

My invention is especially adapted to pipes for natural and manufactured gas, which are required to be perfectly tight; and the object of my invention is to provide means by which said pipes may be conveniently and accurately tested, and the leaks, if any, easily found.

To this end my invention consists in a mercury-gage constructed and arranged in the manner hereinafter described and claimed.

Reference is to be had to the accompanying drawings, forming a part of this specification, in which similar letters and numerals of reference indicate corresponding parts in all the figures.

Figure 1 is a side elevation of the device connected with the pipes to be tested; Fig. 2, an enlarged vertical section of the same, with the connecting-pipes and a portion of the gage-glass removed; Fig. 3, a horizontal section on the line $x$ $x$ of Fig. 2, and Fig. 4 an enlarged transverse section of the air and ether cock and cup on the line $y$ $y$ of Fig. 1.

The case A and the branch pipes A' A', which extend from its lower end at right angles with the same, comprise a single piece of metal, which is cast in the desired shape. The case A has an enlarged central portion, tapers toward the bottom, where it terminates in the pipes A', and is slightly reduced at the top, where it is provided with an external screw-thread, which fits the thread of the nut B, which is screwed thereon.

A plug C, having a longitudinal tubular recess $a$ therein and a shoulder 1, which fits in the end of the case A, is inserted in the upper end of the case and held in place by the nut B, which encircles the plug and bears upon the shoulder 2 thereof, a suitable packing $b$ being placed between the shoulder 2 and the top of the case to make the case A airtight.

The upper end of the plug C is provided with a socket to receive the gage-glass D and is externally threaded to receive the nut $d$. The gage-glass D is air-tight, extends upwardly from the end of the plug C, and is provided with a slotted metal shield $e$, which extends the entire length thereof, and which is provided at the lower end with an annular laterally-extending flange $e'$, which rests upon the upper end of the plug C and enables the shield $e$ and glass D to be held thereon by the nut $d$. The shield $e$ extends over the top of the glass D, so that when the glass is placed in the socket of the plug C and the flange $e'$ of the shield $e$ placed upon the top of said plug and the nut $d$ screwed thereon the parts will be firmly united. The nut $d$ and all the connections with the pipes are suitably packed, so that the gage will be perfectly airtight.

The plug C may be provided with an ordinary stop-cock E, which may be used when the gage is filled with mercury, although the gage will work as well without it. The cock is intended to keep the mercury in the cup H from flowing into the gage-glass D when the device is being carried about.

A tube F is screwed into the lower end of the plug C, which is tapped and threaded to receive it. The tube extends downwardly to the lower part of the mercury-cup H, and the inner diameter of the tube should correspond with the inner diameter of the gage-glass D and the tubular recess $a$ of the plug C. The mercury-cup H is enlarged at its central portion and is provided with a tapering lower end and with a slightly-reduced upper end, which is internally screw-threaded, so that the cup may be screwed upon the threaded boss $f$ of the plug C. The cup H will thus inclose the tube F and will be inclosed by the case A, so that there will be an air-space J between the cup and case. The upper end of the mercury-cup H is provided with a series of perforations $g$, which extend from the air-space J to the interior of the cup, and which are closed by a piece of chamois-skin $h$ or of suitable cloth through which air may be forced, but which will retain mercury. The chamois skin or cloth is wrapped around the cup H, so as to cover the perforations $g$, and may be attached thereto in any suitable manner.

One of the pipes A' is provided with a globe K and an ether-cup K' upon the upper side thereof, said globe and cup being cast integral with the pipe. The cup K' is provided with a vent $i$, which communicates with the pipe A', and through which ether may be inserted, as hereinafter described.

The globe K is provided with a cock $j$, which is provided with a handle $j'$, which is suitably attached thereto, and with two passage-ways $l$ and $l'$, the passage $l$ passing through the cock in the center, and the passage $l'$ opening laterally from the passage $l$ to the side of the cock. The cock may thus be turned so that the passage $l$ will be in line with the pipe A' and the passage $l'$ in line with the vent $i$ of the ether-cup K'. The passages $l$ and $l'$ open into the pipe A' from the ether-cup K', or either the pipe and ether-cup, or both, may be closed.

To charge the gage with mercury, the simplest way is to remove the nut $d$, shield $e$, and glass D, and pour the mercury into the recess $a$ of the plug C. It will thus flow down into the mercury-cup H, which should be filled to about the point indicated by the line across the lower part of the cup in Fig. 2 of the drawings. One end of one of the pipes A' is connected with the pipe M to be tested, and the end of the other pipe, which is provided with a reducer L, is coupled to an air-pump, care being taken to make air-tight connections with both. The device is then operated as follows: The cock $j$ is turned to open the pipe A' and close the vent $i$ of the ether-cup K'. The pipe M and the gage are then pumped full of air, and as the pressure of the air increases it will force itself through the space J and through the chamois-skin or cloth $h$ into the mercury-cup H. It will then force the mercury up through the tube F and tubular recess $a$ into the gage-glass D. The air-pump is then stopped and the cock $j$ turned so as to stop the pipe A' and vent $i$. If then the mercury settles in the glass, it will be evident that there is a leak somewhere in the pipe M and that air is escaping. To locate a leak, ether is inserted in the gage through the cup K' and vent $i$ and the air-pressure applied. The leak can then be located by the odor of the escaping ether.

Having thus described my invention, what I claim as new, and desire to secure by Letters Patent, is—

1. A pipe-testing gage consisting, essentially, of a hollow case having its lower end terminating in branch pipes adapted to be coupled to an air-pump and to the pipes to be tested and having its upper end externally screw-threaded to receive a packing-nut, a plug adapted to fit into the end of said case, said plug having a shoulder at its lower end to engage a packing-nut, a longitudinal tubular recess therein for the passage of mercury, a socket in its upper end to receive the gage-glass and having its upper end externally screw-threaded to receive a packing-nut, a mercury-cup contained within the hollow case and screwed to the lower end of said plug, said mercury-cup having perforations in its upper end covered with porous material for the passage of air, a tube attached to said plug in line with the tubular recess therein and extending downwardly into the mercury-cup, and a suitable valve or cock arranged in one of the branch pipes of the gage to control the passage of air to the gage, substantially as described.

2. The combination, with the hollow case A, having branch pipes A', adapted to be connected with the pipes to be tested and with a suitable air-pump, and the nut B, adapted to be screwed upon the case A, of the plug C, having the tubular recess $a$ therein, having shoulders 1 and 2 to engage the case A and nut B, having its upper end externally screw-threaded to receive the nut $d$ and provided with a socket to receive the gage-glass D, and having its lower end provided with a threaded boss $f$ to receive the mercury-cup H, the mercury-cup H, adapted to be attached to the threaded boss $f$ and having the covered perforations $g$ in the upper part thereof, and the tube F, screwed to the lower part of the plug C and extending downwardly into the mercury-cup H, whereby the mercury in the cup may be forced through said tube and plug C to the gage-glass D, substantially as described.

3. The combination, with the case A and the plug C, having cock E, and having means, as shown, for attaching it to the case A, mercury-cup H, and tube F, and having its upper end externally screw-threaded and provided with a socket to receive the gage-glass D, of the gage-glass D, adapted to rest in the socket in the end of said plug, the shield $e$, adapted to inclose said gage-glass and having a flange $e'$ to rest upon the end of said plug, and the nut $d$, adapted to engage the flange $e'$ and the screw-thread of the plug and hold said parts together, substantially as described.

4. The combination, with the case A and pipe A', having a suitable cock therein, as shown, and the plug C and gage-glass D, connected with the case A, as described, said plug having a threaded boss $f$ thereon, of the mercury-cup H, adapted to be screwed upon said boss and having perforations $g$ in the upper part thereof, said perforations having a suitable covering to admit the passage of air and prevent the passage of mercury, substantially as set forth.

FRANCIS M. ASHTON.

Witnesses:
HUGH PATTON,
MYAN J. SEERY.